United States Patent [19]

Smyth et al.

[11] Patent Number: 5,325,430
[45] Date of Patent: Jun. 28, 1994

[54] ENCRYPTION APPARATUS FOR COMPUTER DEVICE

[75] Inventors: Brian J. Smyth, Rexdale; Leon C. Vandervalk, Prescott, both of Canada

[73] Assignee: Toven Technologies Inc., Toronto, Canada

[21] Appl. No.: 777,935

[22] Filed: Oct. 17, 1991

[30] Foreign Application Priority Data

Feb. 5, 1991 [CA] Canada ................................. 2035697

[51] Int. Cl.⁵ .............................................. H04L 9/00
[52] U.S. Cl. ................................................. 380/4
[58] Field of Search ...................................... 380/4

[56] References Cited

U.S. PATENT DOCUMENTS

| | | |
|---|---|---|
| 4,352,952 | 10/1982 | Boone et al. . |
| 4,558,176 | 12/1985 | Arnold et al. . |
| 4,683,553 | 7/1987 | Mollier . |
| 4,807,284 | 2/1989 | Kleijne .................... 380/4 |
| 4,959,860 | 9/1990 | Watters et al. .............. 380/4 |
| 5,047,928 | 9/1991 | Wiedemer ................ 380/4 |
| 5,063,596 | 11/1991 | Dyke ........................ 380/4 |
| 5,117,457 | 5/1992 | Comerford et al. ....... 380/4 |
| 5,126,728 | 6/1992 | Hall ......................... 380/4 |
| 5,144,659 | 9/1992 | Jones ....................... 380/4 |

FOREIGN PATENT DOCUMENTS 0283432 9/1988 Fed. Rep. of Germany .

*Primary Examiner*—David C. Cain
*Attorney, Agent, or Firm*—Bereskin & Parr

[57] ABSTRACT

A computing device has storage means, for example fixed and floppy discs, a processor and I/O devices. A communication bus connects this device to a security module which includes data encryption circuitry. The security module preferably also includes its own microprocessor, security storage and a token coupler for copying to a token, for example an IC card. Data stored on the storage means is encrypted in accordance with keys read from tokens in the token coupler. Different levels of encryption and access can be provided.

26 Claims, 2 Drawing Sheets

ENCRYPTION APPARATUS FOR COMPUTER DEVICE

FIELD OF THE INVENTION

This invention relates to computing devices, and more particularly to portable computers such as laptop computers. It more particularly is concerned with a security module for providing an enhanced degree of security for data and applications stored on such a laptop, by the use of encryption techniques and IC card technology.

BACKGROUND OF THE INVENTION

Over the past few decades, the power of computing devices has progressively increased, whilst at the same time the size of various computing devices has decreased considerably. This led to the development of personal or desk top computers of relatively small size. Such computing devices have become even more compact and powerful, leading to the development of so-called laptop computers. Such a laptop computer has dimensions typically comparable to a conventional businessman's brief case, and as such can be readily transported by a user and taken wherever the user wishes.

Now, when computing devices were of a relatively large or fixed sized, security was relatively easily controlled. At a basic level, one could simply use long established security techniques, such as locked doors etc., to control actual physical access to the computer. Now that smaller and more portable computing devices are available, security becomes, a much greater and entirely different problem. In the case of laptop and other portable computers which can be carried around, an administrator has a problem of simply not knowing where a computing device is at any one time. It is also possible that a laptop computer could simply be lost or simply left in a public place, e.g. on public transit.

Bearing in mind that laptop computers are frequently used for storing and processing sensitive data, for example tax information, investigative data collected by police and other authorities, it is extremely important to ensure that the data is maintained secure, even if the laptop computer is accidentally lost or mislaid.

This problem has been recognized, but current attempts at providing any degree of security have been crude and ineffectual for a variety of reasons.

It is known to provide a simple password control for access to certain files. This suffers from the fundamental disadvantage that the files themselves are still perfectly readable, i.e. they are not encrypted in any way. Accordingly, whilst any ordinary user, who is not supposed to have access, would be stopped by the password control, a skilled computer professional could in many cases gain access to the files.

It has been known to provide for encryption of data by means of a software program. This has a number of disadvantages. Firstly, such an encryption technique is relatively slow. Secondly, it relies on the fact that the user will, in fact, encrypt the necessary data. There are many situations, where an administrator or supervisor needs to be confident that, for all the laptops for which they are responsible, the appropriate degree of security is in fact being provided. In other words, there should be no mechanism by which an individual user can subvert or avoid using the required level of security.

Another mode of controlling access to individual computing devices is by means of an IC card. An IC card is a card, somewhat similar physically to a conventional credit card, but including a microprocessor and memory, to give it some data processing capabilities. Known techniques rely upon provision of an external IC card reader connected to the laptop. By itself, this again provides for no data encryption, and as the IC reader is separate from the computing device, it is possible for a knowledgable person to detach the card reader and gain access to the files. Further, the provision of a separate IC card reader is physically highly inconvenient, particularly for a portable or laptop computer.

Accordingly, what is desired is a system or modification to a laptop computer, which provides a high degree of security, to prevent unauthorized access to one or both of data and application files. The system should be such as to ensure that a minimum level of encryption is provided to all the files, which cannot be overridden by a user. Further, it is desirable that such a system should provide different levels of access, so that there is one level enabling all the files to be changed, and at least one further level which provides more restricted access.

Preferably, the system is such that it is wholly integrated into a laptop or other computing device, such that the portability of the device is not impaired. Further, the integration should be such as to render it virtually impossible to remove the security elements or module incorporated into the device, without detailed knowledge of the whole device.

BRIEF SUMMARY OF THE PRESENT INVENTION

In accordance with one aspect of the present invention, there is provided a computing device comprising: a storage means; processor means; means for inputting and outputting data; communication bus connected between the storage means, processor means and means for inputting and outputting data; and a security module connected to the communications bus and including data encryption circuitry for encrypting data stored on the storage means.

The module, for insertion into a computing device, the security module comprises: a microprocessor; security storage means; a microprocessor bus connecting the microprocessor; a security multiplexer connected to both the expansion communication bus and microprocessor; and encryption circuitry connected to the security multiplexer, the microprocessor controlling the security multiplexer so as to selectively connect the encryption circuitry to one of the microprocessor bus and the communication bus.

BRIEF DESCRIPTION OF THE DRAWING FIGURES

For a better understanding of the present invention and to show more clearly how it may be carried into effect, reference will now be made, by way of example, to the accompanying drawings which show and provide an embodiment of the present invention and which:

FIG. 1 is a block diagram showing the hardware of a security module in accordance with the present invention incorporated into a laptop computer; and FIG. 2 is a schematic showing the relationship between the software and hardware of the preferred embodiment.

DESCRIPTION OF THE PREFERRED EMBODIMENT

The present invention is primarily intended for providing enhanced security to a laptop computer. The preferred embodiment described below relates to a security module in accordance with the present invention, inserted into a Zenith Supersport 286e. It is to be appreciated that the invention is applicable to a wide variety of computing devices, which need not necessarily be portable or laptop computers.

Figure 1:
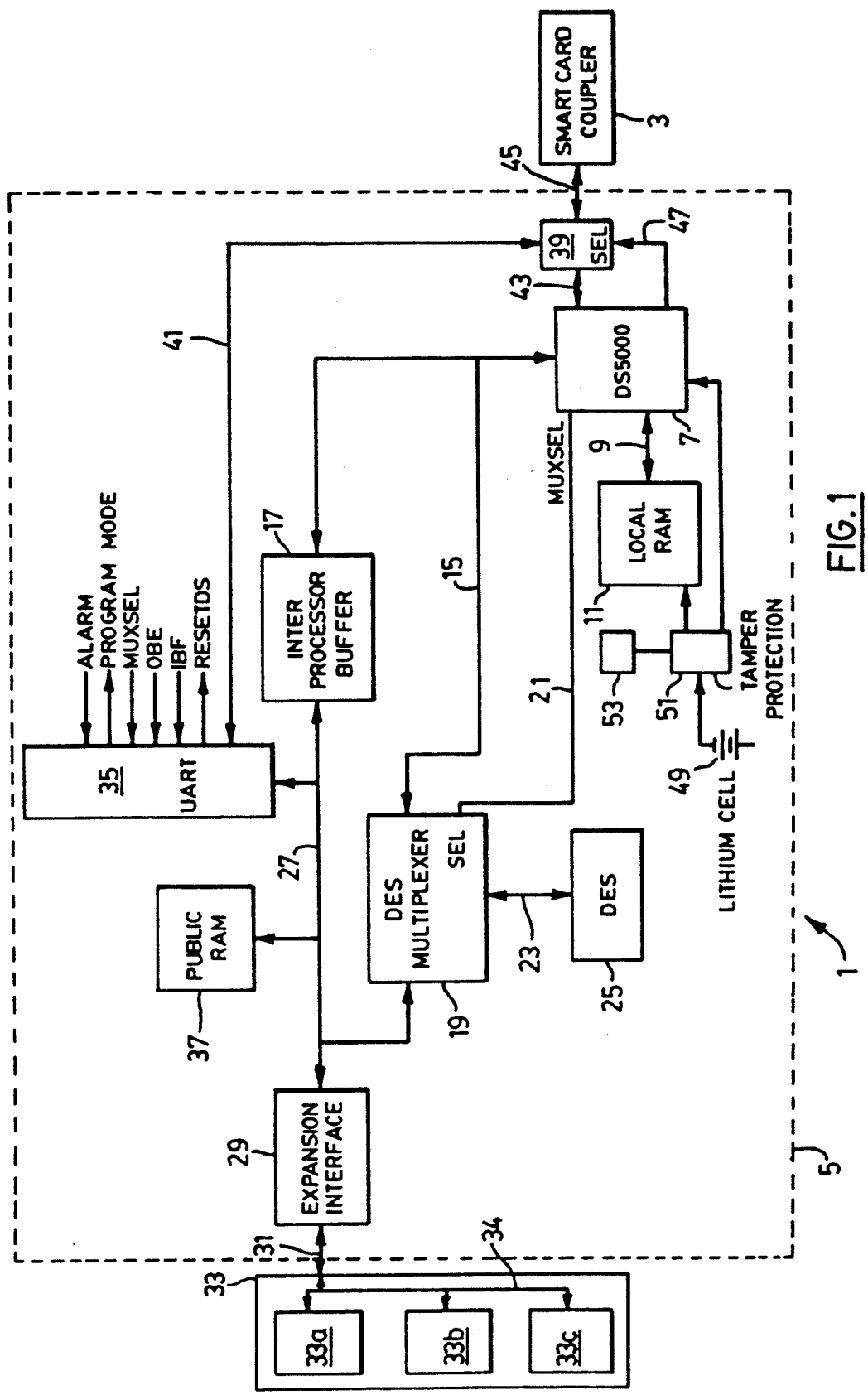

Referring to FIG. 1, the security module in accordance with the present invention is generally indicated by the reference 1. The security module 1 includes the circuitry components shown in FIG. 1. The conventional components of the laptop, i.e. those common with a Zenith Supersport 286e are indicated generally at 33. As discussed below, modifications are made to some of the conventional components.

To enable the security module 1 to be incorporated into the Zenith Supersport 286e, the standard 3.5 inch fixed disc, incorporated in the conventional laptop 33, is removed. It is replaced by a 2.5 inch fixed disc of similar capacity. This leaves enough space for the circuitry of the security module 1, including a IC card coupler, shown at 3 in FIG. 1. The laptop, incorporating conventional elements 33 with the 2.5 inch fixed disc and the security module 1, is referred to as a secured laptop.

The other components of the security module 1 are mounted on a con, non circuit board, indicated schematically at 5.

The module 1 includes a microprocessor 7. Here, the microprocessor 7 is a Dallas Semiconductor DS 5000 high performance 8 bit microprocessor. The DS 5000 is chosen as it is well suited to data encryption and assists in preventing unauthorized access to the encrypted data or applications. There are only a few locations at which such information may be available in the clear, i.e. not in an encrypted form.

The microprocessor 7 is connected via an encrypted address and data bus 9 to a local RAM 11. The bus 9 is a local address/data/control bus for program and data memory. It is used by the microprocessor 7 to communicate with the memory 11, which is a private, nonvolatile memory, which has the capacity of 32 Kbyte. This memory 11 is partitioned by the associated software module into partitions of data/program memory. Here the division is in two 16 Kbytes code space and 16 Kbytes data storage. This bus 9 is encrypted using software encryption logic located within the microprocessor 7.

The microprocessor 7 includes security circuits including an address encryptor, data encryptor and an encryption key word.

The address encryptor is used to transform "logical" or conventional addresses on an internal address bus within the microprocessor 7 into encrypted addresses which appear on the bus 9. The data encryptor transforms data on an internal data bus within the microprocessor 7 into encrypted data during write operations. When data is read back, the data encryptor restores it to its true value.

Although each encryptor uses its own algorithm for encrypting data, both depend on a forty bit encryption key word. This key is downloaded into the micro processor during system initialization. This is done in a manner that ensures it is, in effect, totally unknown and inaccessible, so that nobody can directly access and decipher the contents of the RAM 11. Here, it is set by the date and time of initialization.

The microprocessor 7 communicates via local microprocessor bus 15 with both an interprocessor buffer 17 and DES multiplexer 19. Additionally, a select line is connected from a MUXSEL output of the microprocessor 7 to a select input SEL of the DES multiplexer 19, as indicated at 21.

The DES multiplexer 19 is in turn connected via a DES engine bus 23 to DES hardware or engine 25. Here, this is a Western Digital WD20C03A.

The interprocessor buffer 17 and the DES multiplexer 19 are connected by a buffered interface bus 27 to an expansion interface 29. The expansion interface 29 is in turn connected to the standard expansion bus 31 of a conventional laptop 33. This expansion bus 31 provides address/data/control signals to the security module 1.

The interface bus 27 is essentially controlled by the laptop 33. The DES engine bus 23, as detailed below, is controlled either by the laptop 33 or by the microprocessor 7, depending upon the status of the select line 21.

In known manner, the conventional laptop 33 has a primary storage means 33a, a processor means 33b, means for inputting and outputting data 33c, and a communication bus 34 connected between the elements 33a, b, and c.

Also connected to the interface bus 27 are a UART 35 and a public RAM 37.

The UART 35 here is a 16C450 UART from Western Digital. It is used to communicate to the microprocessor 7 during serial program load mode. A serial boot strap loader provides a method of initially loading software into the RAM 11 for the microprocessor 7. The secondary function of the UART 35 is to service a parallel I/O port.

The public RAM 11 here provides for 32 Kbytes of storage and is used for specific variable storage and provides a sector buffer for encryption/decryption.

The inter-processor buffer 17 is used to transfer data between the laptop 33 and the microprocessor 7. This buffer contains two status bits to indicate the status of the buffer contents.

The local microprocessor bus 15 is not encrypted. This bus is used by the microprocessor 7 within the module 1 for communications to and from the DES hardware 19, 25 and the interprocessor buffer 17.

The interface bus 27 is not encrypted. This bus is the buffered expansion bus for the computer 33 and provides the only communication path between the computer 33 and the module 1. The computer 33 uses this bus 27 to communicate to the DES hardware 19, 25, the interprocessor buffer 17 and the public RAM 37.

A download data pathway is provided between the UART 35 and a serial interface multiplexer 39, this pathway being indicated at 41. This pathway 41 provides a means for initializing the microprocessor 7 of the module 1.

A serial interface 43 is connected between the serial interface multiplexer 39 and the microprocessor 7. This serial interface 43 provides a variable speed asynchronous communications port, and if the module 1 is uninitialized, this interface 43 is connected to the download data pathway 41. Thus, in the uninitialized state, the multiplexer 19 will default to connecting the microprocessor 7 to the UART 35, rather than to the IC card coupler 3. A IC card serial data pathway 45 is provided between the IC card coupler 3 and the multiplexer 39.

The multiplexer 39 includes a select port which is connected via a select line 47 to the microprocessor 7.

The DES multiplexer 19 is used to switch the data bus and controls signals of the DES engine 25 between the microprocessor 7 and the laptop computer 33. It is provided that the default condition for the switching line 21 is such that the DES engine 25 is connected to the microprocessor 7. Thus, in the event of tampering, and the application for the microprocessor 7 is lost, as detailed below, the DES engine 25 will be connected to the microprocessor 7, effectively disabling access to the DES engine or hardware 25 from the computer 33.

To provide for tamper protection, a lithium cell 49 is connected to tamper protection circuitry 51, which in turn is connected to the RAM memory 11 and the microprocessor 7. The lithium cell 49 provides for 3 volts of DC power, when the main power supply is removed.

The tamper protection unit 51 includes tamper switches, which provide protection by turning off the current source for the memory 11 and the microprocessor 7. When either a case for the module 1 (not shown) is separated by more than several millimeters, or photodetectors, strategically located within the enclosure, are exposed, then the tamper protection circuitry 51 is activated. This then switches off the current source, so that all code/data stored in the RAM 11 is lost. A photodetector is indicated schematically at 53.

The IC card coupler 3, comprises a physical IC card connector, and appropriate interface hardware, for interface to and from the microprocessor 7. This coupler hardware provides power, control, data I/O, clock and reset signals for the IC card, in known manner.

Figure 2:
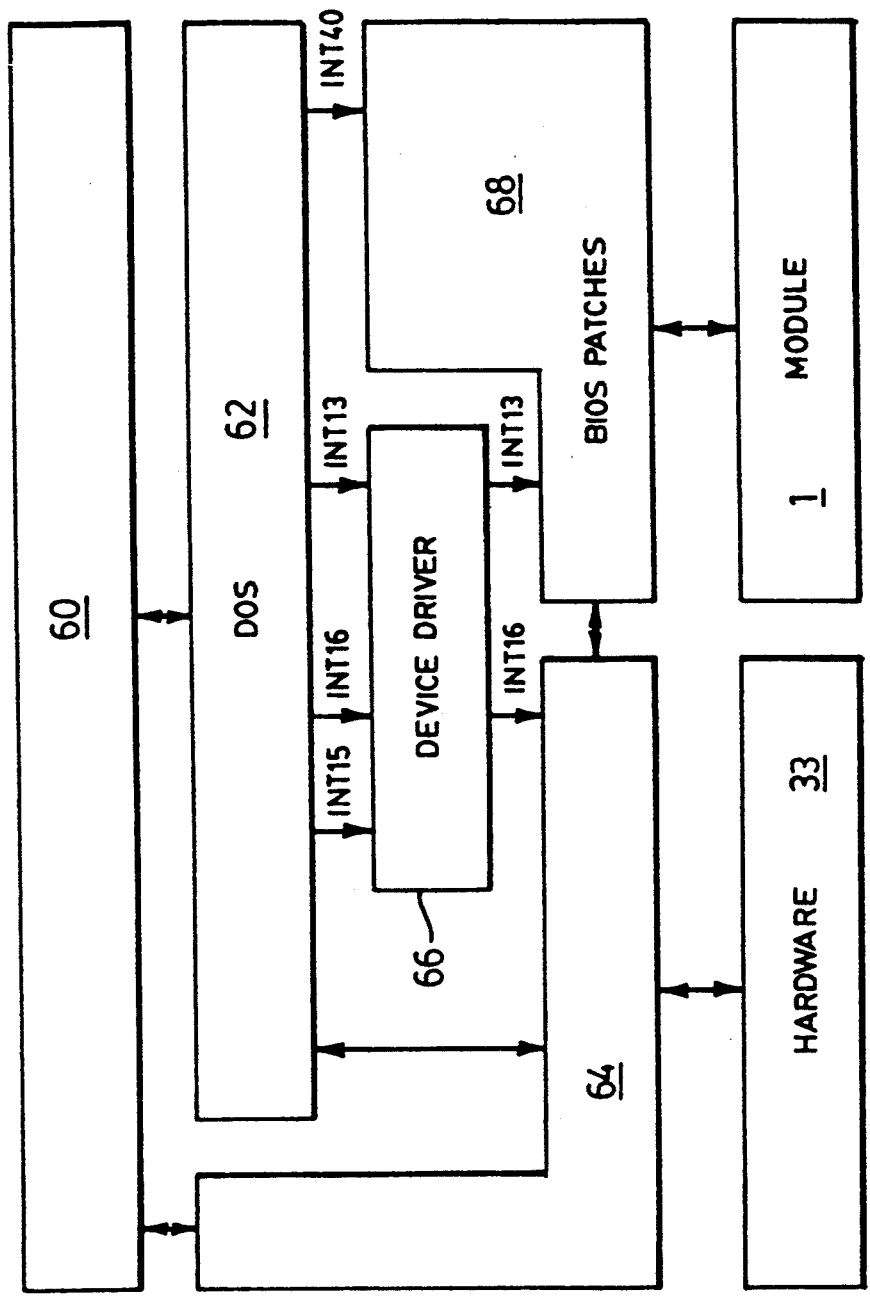

The following additional modifications are made to the conventional laptop, namely here the Zenith Supersport 286e. The expansion connector is disconnected from the rear expansion bus, as this has to be connected to the expansion interface 29 as discussed. The standard BIOS ROMs are placed with a modified set of BIOS ROMs including the BIOS patch 68 (FIG. 2).

The main board of the computer 33 is modified such that, even if the security module 1 including the IC card coupler 3 is removed and the modified ROMs are replaced with conventional ROMs, the computer 33 will still not operate. This provides an additional level of security. The substitution of the 2.5 inch fixed disc for the conventional 3.5 inch fixed disc drive requires the modification of the standard fixed disc bracket.

The modified ROMs include patches and code necessary to meet the operational specifications.

The microprocessor 7, based on the Dallas semiconductor DS 5000, provides extensive software security using a unique on-chip software security module. It serves primarily as a IC card coupler interface for the computer 33. This prevents unauthorized individuals from reading and assembling program/dataRAM. Coupler software is loaded and executed by the microprocessor 7 in encrypted form, rendering the contents of the local RAM 11 virtually unintelligible to an outside observer. The encryption algorithm uses the 40 bit encryption key word which is entirely stored and protected within the microprocessor 7. This key is programmed by initialization routines run on the laptop, as described below. The key is unique for each initialization routine. Any attempt to discover the key after it has been loaded into the microprocessor 7 results in its erasure by the tamper protection circuitry 51. This then renders the program/data contents of the local RAM 11 useless. Typically, the microprocessor 7 is used to read an encrypted DES encryption key from an IC card, and transfer an encryption key to the key register of the DES hardware 25. Once the key has been loaded into the DES key register, any record of it is erased from the local RAM 11. The only time the key appears in the clear is when it is being transferred from the microprocessor 7 to the DES key register.

Transfers between the local microprocessor 7 and the computer 33 are via the interprocessor buffer 17. The microprocessor 7 includes its own application software, which supports a variety of commands used to coordinate the operation of the IC card coupler 3 and the DES engine or hardware 25.

Turning to the other aspects of the security system, principally the software aspects, these will now be described in relation to FIG. 2. Here again the hardware of the security module is indicated at 1, and the basic computer lap top is indicated at 33.

Conventional application software is indicated at 60, and this communicates with DOS indicated at 62 and BIOS indicated at 64. In known manner, the application software can then communicate directly with the hardware through the BIOS 64 or indirectly through the DOS 62 and then BIOS 64.

The DOS 62 has its Interrupts 1B, 13 and 16 connected to a security device driver 66. In effect, the device driver 66 intercepts these interrupts. A further interrupt 40 is intercepted by BIOS patches indicated at 68.

Interrupt 13 from the device driver 66 is connected to the BIOS patches 68, whilst interrupt 16 from the device driver 66 is connected to the BIOS 64.

The DOS provides a unified interface between the application software and the BIOS. The DOS provides a set of functions that can be requested from the application software including disc I/O requests. These requests ultimately require the BIOS to perform a read or write operation. The DOS performs a request to the BIOS by issuing a software interrupt, in known manner. These interrupts provide a means to call separate routines. The software interrupt used to call read/write operations is INT 13. The DOS used in this invention has been modified to provide a pointer to a string which represents a file associated with the INT 13 request. The pointer will assume a null value if the INT 13 request is associated with a system disc I/O, i.e. directory requests.

The Device Driver 66 provides a means for intercepting specific requests to the BIOS 64. The driver 66 intercepts the Interrupt 13 request made to the BIOS 64. The device driver 66 includes a list of files, including the path, on the system. When the driver 66 intercepts an Interrupt 13 request, it will obtain the file name and path associated with the request, using the pointer provided by the modified DOS. From this, the device driver 66 can determine if the Interrupt 13 request is associated with a file in its list, a system request, or a file not listed. The result of this determination is placed in a reserved memory location so that the appropriate BIOS patch 68, for the Interrupt 13, can then load the required DES key into the DES hardware or engine 25.

As shown in FIG. 2, the device driver 66 additionally intercepts the Interrupt 1B and Interrupt 16. Interrupt lb is the Ctrl—break handler, and the response to this is to ignore it. Device driver 66 intercepts the Interrupt 16 and strips the Ctrl—c strokes from the keyboard data stream.

For performance reasons, DOS contains a pool of buffers that are used for storing data and programs, in transit to or from the disc storage system. The size of the pool is defined by the user and there might be, for example 20 buffers. DOS checks this pool when a new request to load or store data is made by upper levels of the operating system. Commonly accessed data will be in the buffers, and hence can be accessed more quickly and will not have to be loaded from the disc.

For the present purposes, DOS appears as an interface between File Services on the one hand, and the Buffering Mechanism on the other hand.

The problem in implementing transparent encryption is that requests made by an application and requests from the buffering mechanism to the hardware do not have a 1-to-1 correspondence. This is direct consequence of buffering. Here, as detailed above, a bypass is provided around the buffering mechanism while maintaining the performance level provided by buffering. In effect, the code outlined above provides a bypass around the buffering mechanism, so as to identify the requests made by File Services, to ensure that the appropriate encryption key is called for encryption/decryption.

In accordance with the present invention, a variety of patches have been added to the BIOS. The significant modifications to the BIOS are:
Intercept for set ups;
Security module startup routines;
Intercept for INT8;
Intercept for INT13;
Intercept for INT40;
Remove the check for the expansion box;
Remove the ROM checksum routine;
Intercept to security module startup code;
Intercept to fixed disc bug fix.

The intercept routine for set up is used to check the card type in the coupler 3, prior to executing standard BIOS set up routines. The set up routines are used to define the hardware configuration of the machine. Only if the card type is a system administrator card, as detailed below, will the setup program run. As indicated below, if any other type of card is present, an error message will be displayed and the machine will be rebooted.

The security module startup routines include, password entry and card initialization.

INT 8 is a time interrupt service routine, which typically is called ever 54 ms. This routine is used to check the state of an alarm on the security module 1. The alarm is set if a card is removed from the coupler 3 when it should not have been.

Intercept for INT13 is a routine to intercept all INT13 read/write sector calls for the hard or fixed discs (service functions 2 and 3). This intercept routine will decrypt/encrypt each sector read/written using an appropriate key, as detailed below. As mentioned above, the device driver 66 provides an indication as to the type of file, so the appropriate access key can be selected.

The intercept routine for INT40 is used to intercept all INT40 read/write sector calls for floppy disc drive. This routine checks for the card type prior to each sector access, and will encrypt/decrypt each sector using the user encryption key if a user card is in place; if a system administrator card is in place, all floppy access is done in the clear, i.e. without any encryption/decryption, and again this is detailed below.

The microprocessor 7 is used for a number of basic functions, namely: communications to and from the IC card; control of key loading to the microprocessor 7; and monitoring card status. In general, the microprocessor 7 receives commands from the computer 33 via the interprocessor buffer 17. Each command is an 8 bit character, the upper half of which specifies command and the lower half of which specifies the argument. The computer 33 will always act as a master, with the microprocessor 7 never requesting unsolicited data from it.

The cards are used to write keys to appropriate storage locations. Thus when a user card is in the coupler 3, the user encryption key is written to 1 of 16 unique storage locations. When a system administrator card is in the coupler 3, it is written to a system administrator key location. The key is encrypted before it is written to the IC card using a primary or access key.

The access key can also be written using the microprocessor 7.

A number of utility codes are provided to initialize and maintain the complete secure lap top. These include: codes used to download object code to the microprocessor 7; test code for the microprocessor 7; diagnostic functions, maintenance and other utility functions. Whilst some of these could follow conventional practice, others that are unique to the invention are described below.

One of the utility programs is a download code, for downloading object code to the microprocessor 7. As noted above, the microprocessor 7 is, in the preferred embodiment, a DS 5000, and these functions are set out for this microprocessor, as follows:
reset microprocessor 7;
force microprocessor 7 into load mode and establish communications at 4800 baud;
unlock microprocessor 7, to clear the security lock bit. This consequentially clears the encryption registers and yields the contents of the local RAM 11 useless;
program the MCON register of the microprocessor 7 to 88H, and hence set the data/code partition to 16 Kbytes and the range to 32 Kbytes;
program the encryption register with the date and time as a unique 40 bit encryption key word, and hence, provide a degree of security to data encrypted by the microprocessor 7;
enter Intel hex load mode;
download code into the microprocessor 7 (see encryption option below), lock the microprocessor 7 and then force the microprocessor 7 into run mode;
reset microprocessor 7.

In order to protect the microprocessor 7 from unauthorized users, it is encrypted using DES cipher feedback. A diagnostic DES key is loaded from a diagnostics IC card. In order to load the diagnostic DES key, a boot strap program is downloaded into the microprocessor 7 in the clear prior to downloading the real or actual code for the microprocessor 7. The following procedure will download the encrypted code into the microprocessor 7:
BOOT secure laptop;
insert diagnostic IC card into coupler 3;
Download Bootstrap routine, to read the diagnostic card and initialize the DES engine 25;
Utilize DES engine 25 to decrypt the code for the microprocessor 7 and download it to the microprocessor 7.

In order to encrypt the code for the microprocessor 7, an encryption utility is supplied, which will encrypt using the DES key from the diagnostic IC card. The procedure used to create an encrypted object module is as follows:

insert diagnostic IC card;

download the bootstrap routine for the microprocessor 7 to read the diagnostics card and initialize the DES engine, as above;

encrypt file utilizing diagnostic key and create a new file name for encrypted file;

correspondingly, a code is provided for creating a bootable diagnostics floppy diskette.

A diagnostics program provides a mechanism to test the operation of the security module 1. The diagnostics performs the following tests:

test local RAM 11;
test UART 35;
download test code to microprocessor 7;
test interprocessor buffer 17;
test IC card coupler 3;
test DES hardware or engine 25;
test local RAM 11.

A test code is provided which effectively connects the microprocessor 7 to the computer 33, and is extremely convenient for performing maintenance functions. A code is provided that simply displays the revision number of the currently running code on the microprocessor 7 and the group member number for the machine on which the program is run. This code provides information from the microprocessor 7.

The code is provided for implementing maintenance functions, and another code is provided to enable users to change their respective passwords on their smart cards.

A further utility code is used to initialize/locate user files, or to create a system file table. This has three principle options. In the first option, it will scan drive C; searching for all files and directories. This produces two lists, a subdirectory list and a files list. These lists are added to the device driver 66.

A second option is used to create a subdirectory and files list of all user files on drive C: This option determines which files are user files by reading the device driver 66 to determine the current system file/subdirectories.

A third option is used to create a new file in the device drive 66, which contains all current system files. This is done by scanning drive C: for all files and removing all the user files.

IC card coupler 3 is designed for use with SPOM 21 mask 9, 24 K bit 5 volt EEPROM IC cards. There are three classes of IC cards used with the present invention, namely: system administrator card; user cards; and diagnostic cards. System administrator cards are used to manage groups of, for example, up to 64 users. The user is considered to own a secure laptop in accordance with the present invention. The laptop associated with a user contains a unique access key and group member number. The access key, entered by the system administrator, is a key to encrypt/decrypt all access to the IC card. The group member number is used as a pointer to access system administrator key and password information located on the system administrator card for the group. As discussed above, the diagnostic card is used for decrypting the code for the microprocessor 7 prior to downloading.

The system administrator card is configured as a list of keys and passwords encrypted using the access keys of group member numbers for the laptops in the group. For example, when the microprocessor 7 receives a request to read the system administrator key from a system administrator card, it uses the group member number to find the offset and to list the keys and passwords. The microprocessor 7 then uses the access key to decrypt the key stored in the DES key structure.

MODE OF OPERATION, INCLUDING BOOT PROCEDURE

Dealing first with the boot procedure, there are four distinct boot routines or paths, namely: a diagnostic boot; initialization boot; system administrator boot; and user boot.

When the laptop or computer is initially powered up, the BIOS initializes the hardware, in known manner. After the hardware in the basic computer 33 has been initialized, the jump to Security Module start up code in the BIOS patches, passes control to the security module 1. The startup code then determines the integrity of the microprocessor 7. If the microprocessor 7 does not operate as expected, the start up code will set a flag to indicate that the machine is in a diagnostics mode. If the microprocessor 7 does respond to requests, then a test of the access key is performed. If an access key is found stored within the non-volatile memory and is invalid, then an initialization boot is done. If the access key is valid, the startup code requests that a IC card be inserted into the coupler 3, if not already present. It then determines the card type. Note that upon initialization, a coupler key is stored in the RAM 11. It is then necessary for an IC card introduced into the coupler 3 to have the same coupler key stored on it, in order to grant access to the module 1. The coupler key is hard coded on the IC card and in known manner provides a low level of security for the IC card.

If the card in the coupler 3 is neither a user card nor a system administrator card, then an error message is displayed and the machine will recommence the boot procedure. For a system administrator card, a system administrator boot is performed, whilst similarly for a user card, a user boot is performed. The diagnostics mode is necessary, in order to limit access and operation of the computer or laptop to authorized users, and to provide a mechanism for loading code into the microprocessor 7.

In the diagnostics mode, the computer 33 will disable all access to fixed disc(s), and check for the presence-of an appropriate diagnostics disc in drive A. Assuming an appropriate disc is present, then a boot is performed to drive A. The system administrator is then required to load the microprocessor 7 object code into the microprocessor, using the appropriate load program.

As mentioned above, to protect this code, a load program is used to download a bootstrap routine into the microprocessor 7 that determines if a diagnostics card is in place. When such a card is in place, then the DES engine 25 is loaded with the DES key from the diagnostic IC card. The load program is then used to decrypt the real microprocessor code, and download it into the microprocessor 7.

The initialization boot procedure is performed only if the microprocessor 7 responds to commands, and if the access key is invalid. This procedure prompts the system administrator to enter an access key, system administrator key and system administrator password. It requires the presence of either a special system administrator card, or an acceptable IC card in the coupler 3. If a blank card is present in the coupler, then the card is initialized as a system administrator card and the group member number for the machine performing the initialization is set. If a system administrator card is present in the coupler 3 during initialization, then the card is interrogated to determine the next group member for this card. The card is then written to the new group member location.

Considering the system administrator boot procedure, this is performed if a system administrator card is detected in the coupler 3 during startup. It provides a password challenge, to secure the laptop. The system administrator boot is used by system administrators to gain access to the whole laptop to perform maintenance functions. After the laptop has been booted using this procedure, all floppy disc access is performed in the clear and fixed disc access is performed using the system administrator key. Only files encrypted using the system administrator key will be usable by the system administrator in this mode.

All files created using user encryption keys, assuming these are different from the system administrator key, will be unreadable by the system administrator.

A user boot procedure provides a password challenge, similar to the system administrator, so as again to secure the laptop. This is performed if a user card is detected in the coupler 3 during startup. This procedure is used by users to gain access to the secure laptop. After booting this mode, all floppy disc access is encrypted using the user key, and fixed disc access is performed using either system administrator key or the user key depending on the files read/written.

ENCRYPTION TECHNIQUE

In this preferred embodiment of the security module 1, two different forms of DES encryption are used, namely Electronic Code Book (ECB) mode and Cipher Block Chaining (CBC) mode. ECB is the simpler variant of these two, and is used to encrypt various passwords and keys, for example as stored in the key register of the DES hardware 25. On the other hand, the CBC mode is used to encrypt all applications and data stored on disc.

ECB mode simply takes two pieces of data, e.g. a key and plain text, and combines them to produce an encrypted output. This simple 1-for-1 mapping allows quick decryption of keys stored within the machine.

CBC mode uses two pieces of data plus the original plain text to produce the encrypted text. The two pieces of data are an Initial Vector (IV) and the appropriate key. The key essentially has the same definition as for the ECB mode. The IV is the seed or starting point for the encryption algorithm, which ensures that the encryption produces an unpredictable cryptographic bit—stream. Each cycle of the algorithm depends on the key and the previous cycles data. With the same key and input plain—text data, a different IV will cause a different cryptographic stream. The IV quantity does not have to be secret, but in this implementation it is maintained secret, to provide further enhancement of the system security.

Here, for performance reasons, the IV is constant. It is quite possible the IV could be altered for every sector on a disc, i.e. it would have a unique seed value for each. This would provide an even greater degree of security and make it more difficult for someone to decrypt the data. For example, the IV could be calculated using the physical address of the sector on the disc (cylinder number, head number and sector).

It is to be appreciated that there is no necessity for any particular encryption technique to be used. Here, the DES encryption technique is chosen, since there are commercially available IC chips which provide the necessary encryption facility. It is possible for any appropriate encryption technique to be employed.

SYSTEM ADMINISTRATOR FUNCTIONS

The system administrator has access to the system so as to be capable of performing the following maintenance functions:
1. Set or change access encryption keys;
2. Change system administrator passwords;
3. Set/change user passwords;
4. Set/change system administrator encryption key;
5. Set/change user encryption key;
6. Set/change communication encryption key;
7. Read/Write user data from clear diskette;
8. Miscellaneous utility functions;
9. Application management/exit to DOS.

Changing an access key requires the presence of both the system administrator and user IC cards as the data stored on these will have to be rewritten with a new access key.

The system administrator IC card is updated first, and then the software will call for this card to be replaced by the user cards. The user cards are then inserted sequentially, and updated in turn.

To change a system administrator password, it requires verification of the old password and then a double entry of the new password. Similar considerations apply to changing the user password. But again, this will require the presence of the administrator card as well as the user card who's password is to be changed.

To change the system administrator encryption key, both the system administrator and user IC cards are required. These are again inserted sequentially. Note that where this key is changed, then the system will have to be reloaded.

Similarly, the user encryption key can be changed and again this requires the system administrator card to be present together with the relevant user card. As the user data files are encrypted with this key, they will all have to be reloaded.

An option is to store a communication encryption key on the user card. To change this, the administrator card and the relevant user card will have to be present.

To read or write user data from a clear diskette, the relevant user IC card must be present and in the coupler 3. Data is copied from a clear diskette and encrypted. Data already encrypted will remain encrypted if it is transferred to another diskette. This also requires the presence of the system administrator card.

The miscellaneous utility functions could include the following:
1. create user IC card;
2. configure system, which may require reboot when finished;
3. set or change number of password attempts allowed;
4. remove system from group.

The system configure function can include a variety of standard features, such as: setting time and date; communication details such as serial or parallel port addresses, modem information; RAM size; external floppy disc.

The system administrator will typically also load standard application programs onto the computer. These have been encrypted with the administrator key. The appropriate data, etc. could also be loaded by the system administrator, which again would be encrypted with the system administrator key.

USER FUNCTIONS

The user will receive the laptop after the system administrator has loaded the system with various keys, applications and data required. Further, the user should then receive his/her IC card which has already been set up as described in the proceeding section.

On power up, the user will be requested to insert their card, followed by a request for the appropriate password.

The user will then be given the option of accessing various applications, e.g. word processing applications, spread sheets and data processing programs.

Note that the system administrator encryption key is stored on the user IC card and is used to decrypt the application programs. The user does not have any access to the system administrator encryption key for any other functions.

All files created by the user will be encrypted using the user encryption key. The system administrator card and password are required for importing/exporting user data in the clear.

A utilities option for the user allows the user to perform functions such as changing the user password or making encrypted diskette copies of data for storage, backup or transport purposes. Other conventional functions such as deleting a file, renaming a file, directory functions, disc formatting can be performed.

Below is a table showing two laptops (Unit 1 and Unit 2) and how different combinations of encryption keys can be used to facilitate a variety of operational schemes:

| Laptop | Access Key | Sys. Key | User Key | Operational Impact |
|---|---|---|---|---|
| Unit 1 | A | B | C | Users must use their own laptop. |
| Unit 2 | X | Y | Z | Date cannot be exchanged on diskette |
| Unit 1 | A | B | C | Users must use their own laptop. |
| Unit 2 | A | Y | Z | Data cannot be exchanged on diskette |
| Unit 1 | A | B | C | Users can share laptops. Users can share applications |
| Unit 2 | A | B | Z | Users cannot access each others data. |
| Unit 1 | A | B | C | Users must use their own laptop. |
| Unit 2 | X | Y | C | Data can be exchanged on diskette between Users. |
| Unit 1 | A | B | C | Users can share laptops. |
| Unit 2 | A | B | C | Users can access each others data on fixed hard disc and diskette. |

It should be appreciated that the manner in which encryption is incorporated has two significant effects. Firstly, encryption is inherent in operation of a lap top or other computer equipped with the security module 1; in other words, it cannot optionally be selected by the user, and all users have to adhere to the encryption protocol, if they want to use the computer.

The second principal effect is that the encryption processing is entirely transparent to all operators, that is both a system administrator and the users.

A third aspect of the encryption protocol or strategy is that there are three levels of categories of data stored on the disc.

The first, low level is data stored on disc used to "boot strap" the computing device. In known manner, this is the program which loads DOS into the computer 33. Here, the system administrator key is used to encrypt this program or data. However, it is possible that a separate key could be used.

The second level or category is the system administrator level. In this category, the system administrator determines programs and data that should be protected from general copying and distribution, and loads these encrypted with the system administrator key. The user cards are provided with the system administrator key so that they can decrypt these programs for use, but they cannot make any copies of these programs or data in the clear.

The third level is the user. User data is encrypted with each individual user encryption key, and hence is protected between users, unless they have a common encryption key. Thus, there could be many users storing data on a common disc, but each user would only be able to access and de-encrypt their own data.

DOS has certain data structures on the disc that are used to keep track of disc usage. These areas are classed as level 1.

At installation time, a SWEEP program is run to initialize, locate user files, and to create a system file table. This has three options.

In a first option, this program will scan drive C:, searching for all files and subdirectories. Two lists are produced, a subdirectory list and a files list. These lists are added to the device driver 66, the length of which is dynamically changed. Subdirectory list here consists of 65 bytes/entry. The first byte indicates the length of the subdirectory string, with the remaining 64 bytes containing the subdirectory path from the root. The path name is left justified and padded with the space character. The files list consists of 14 byte/entry. The first byte is a pointer to the associated subdirectory entry. The second byte indicates the length of the file name, and the remaining twelve bytes contains the file name left justified and padded with space characters.

A second option is used to create a subdirectory and files list of all user files on drive C:. This option determines which files are user files by reading the device driver, to determine the current system file/subdirectories. A scan of drive C: is then performed and an exception list is created, with this list being assumed to be all user files currently on drive C:.

Finally, a third option is used to create a new device driver that contains all the current system files. This is done by scanning drive C: for all files and removing all the user files found using the previous option. Assuming that the device driver has been initialized using the first option, the procedure to add new system administrator files would be as follows:

(1) effect second option to create subdirectory and files list of user files;

(2) add new system administrator file;

(3) effect third option to create new device driver 66 incorporating new system administrator files, assumed not to be user files.

Now, as is well known, the normal flow of data within a PC is as follows:

[Application] ... [DOS] ... [BIOS] ... [Hardware]

When DOS or an application requires data, which could be an actual program or pure data, the BIOS translates this request into a form as intelligible by the hardware. Thus, BIOS usually has the code to interface with the hard disc controller, whilst the DOS makes the request in terms of the hardware characteristics (cylinder, head, sector). Here the added code intercepts this request and uses the information provided by the DOS to create a number, which in this implementation ranges 0–2. However, support is provided for a range of 0 to 15. This number is passed to the security module 1, which then uses it to select the key for subsequent encryption/decryption. Modifications to standard BIOS, i.e. the BIOS patch 68 discussed above, take the parameters provided by the DOS to decide if the request is a read or write, and to determine where the data is placed. If the size of the request is less than about 31K, then the data is encrypted/decrypted directly to the public RAM buffer 37. It is then passed onto the original BIOS code to be placed on/taken from the disc. Where the request is larger than 31 K, the data is encrypted/decrypted directly in the users data space and decrypted/encrypted when the BIOS code returns. This leaves the users data in its original form. No interception while the data is encrypted is possible since the whole operation occurs as a unitary operation from the users perspective.

We claim:

1. A computer device comprising: primary storage means; processor means; means for inputting and outputting data; a communication bus connected between the storage means, the processor means and the means for inputting and outputting data; and a security module connected to the communications bus and comprising data encryption circuitry for encrypting data stored on the storage means, a token coupler, for coupling to a token including data processing capability, a microprocessor, a security storage means connected to the microprocessor and a microprocessor bus connecting the microprocessor to the communication bus, and a security multiplexer connected to the communication bus and the microprocessor, with the multiplexer being controlled by the microprocessors as selectively to connect the data encryption circuitry to either the microprocessor bus or the communication bus.

2. A computer device as claimed in claim 1, for use with tokens on which all data is encrypted with an access key, the encryption circuitry having the access key stored therein and decrypting data from a token with the access key.

3. A security module as claimed in claim 1, which includes an interprocessor buffer providing communication between the microprocessor bus and the communication bus.

4. A computing device as claimed in claim 3, which includes tamper protection circuitry and a power supply connected via the tamper protection circuitry to the microprocessor and the security storage means, the tamper protection circuitry being such as to erase the contents of the security storage means and the microprocessor upon detection of tampering with the computing device.

5. A computing device as claimed in claim 4, wherein the tamper protection circuitry includes at least one of a switch to detect unauthorized opening of at least one of the security module and the computing device, and a photosensitive detector for detecting light indicative of unauthorized opening at least one of the security module and the computing device, both the switch and the photodetector activating the tamper protection circuitry to activate that circuitry to erase the contents of the security means and the microprocessor upon detection of such opening.

6. A computing device as claimed in claim 3, which includes an expansion interface connected to the communications bus of the computing device and an interface bus connected between the expansion interface and both the interprocessor buffer and the security multiplexer.

7. A computing device as claimed in claim 6, which includes a public storage means connected to the interface bus and a UART connected to the interface bus.

8. A computing device as claimed in claim 7, which includes a serial interface multiplexer connected between the microprocessor and the token coupler, having a select input connected to and controlled by the microprocessor and a download data pathway connected between the UART and the serial interface multiplexer, whereby the serial input of the microprocessor can be selectively connected to one of the UART and the token coupler.

9. A computing device as claimed in claim 8, which includes tamper protection circuitry and a power supply connecting via the tamper protection circuitry to the microprocessor and the security storage means, the tamper protection circuitry including at least one of a switch for detecting unauthorized opening of at least one of the security module and the computing device and a photodetector for detecting light indicative of unauthorized opening of at least one of the security module and the computing device, the tamper protection and circuitry being such as to erase the contents of the security storage means in the microprocessor upon detection of such opening.

10. A computing device as claimed in claim 2, wherein all data stored on the primary storage means is encrypted with an encryption key which encryption key is stored only on tokens for use with the computing device, the encryption key being encrypted with the access key on each token.

11. A computing device as claimed in claim 10, for use with separate system administrator and user tokens, wherein the encryption key associated with and stored on the system administrator token is a system administrator key and the encryption key for use with and stored on each user token is a user key with each user token additionally having the common system administrator key stored thereon, wherein, when the system administrator token is present, the computing device permits data to be inputted to or outputted from the primary storage means either encrypted with the system administrator key or in the clear which data can be accessed by the system administrator and users, and wherein, when a user token is present, the computing device permits access only to the system administrator encrypted data and all user data input to or output from the primary storage means is encrypted with the user key.

12. A computing device as claimed in claim 11, wherein in addition to the primary storage means the computing device includes a secondary removable storage means, wherein data in the clear may be transferred to the secondary system storage means, when the system administrator token is present, and when the user token is present all data stored on either one of the primary and secondary storage means by the user is encrypted with the user key.

13. A computing device as claimed in claim 12, which includes a device driver, which identifies whether I/O requests to the first storage means are for data encrypted with the system administrator key or the user key, and which includes BIOS modifications which encrypt/decrypt I/O requests to the primary storage means with the appropriate one of the system administrator and user keys and which encrypt/decrypt I/O requests to the secondary storage means with the user key when a user token is present, all I/O requests to the secondary storage means being in the clear when a system administrator token is present.

14. A computing device as claimed in claim 13, wherein each token includes a respective password stored thereon encrypted with the access key, the password being decrypted by the security module, whereby access to the computing device can only be obtained if the operator inputs that password.

15. A computing device as claimed in claim 14, wherein the security module has a coupler key stored therein, and communication can only occur between the security module and a token, having the same coupler key embedded therein.

16. A computing device as claimed in claim 14 or 15, wherein upon initialization, the security module is provided with an encryption key word, which is used for encrypting and decrypting all access to the security storage means.

17. A computing device as claimed in claim 10, 12 or 13, wherein data stored on the tokens is encrypted using one encryption technique, and data stored on the primary storage means is encrypted using a second encryption technique providing a higher level of encryption.

18. A computing device as claimed in claim 10, 12 or 13, wherein all encryption is effected using DES algorithms, and wherein data stored on the tokens is encrypted with the access key using electronic code book encryption, and data stored on the primary storage means is encrypted using cipher block chaining utilizing an Initial Vector.

19. A computing device as claimed in claim 18, wherein a different Initial Vector is used for each sector of stored data.

20. A security module, for integration into a computing device, the security module comprising: a microprocessor; security storage means connected to the microprocessor; an expansion interface; a microprocessor bus connecting the expansion interface to the microprocessor; a security multiplexer connected to both the expansion interface and microprocessor bus; and encryption circuitry connected to the security multiplexer, the microprocessor controlling the security multiplexer so as to selectively connect the encryption circuitry to one of the expansion interface and the microprocessor.

21. A security module as claimed in claim 20, which includes an interprocessor buffer between the microprocessor bus and the expansion interface.

22. A security module as claimed in claim 21, which includes a token coupler, for communication with a token including processing capability which token coupler is connected to the microprocessor.

23. A security module as claimed in claim 22, which includes tamper protection circuitry connected to the security storage means and the microprocessor, and a power supply connected to the tamper protection circuitry, the tamper protection circuitry being such as to interrupt the connection from the power supply to the microprocessor and the security storage means, thereby to erase the contents thereof, upon detection of tampering with the security module.

24. A security module as claimed in claim 23, wherein the tamper protection circuitry includes a switch and a photodetector for detecting opening of the security module, the tamper protection circuitry being activated upon detection of any such opening to erase the contents of the security storage means in the microprocessor.

25. A security module as claimed in claim 23, wherein the microprocessor is initialized with an encryption key word, and wherein all access to the security storage means is encrypted/decrypted with the encryption key word.

26. A computing device as claimed in claim 25, wherein the security module includes a coupler key, and, in order to obtain access to the security module, each token has embedded therein a corresponding coupler key.

* * * * *